US008104387B2

(12) United States Patent
Keegan et al.

(10) Patent No.: US 8,104,387 B2
(45) Date of Patent: Jan. 31, 2012

(54) TUBE STUB REMOVAL APPARATUS

(75) Inventors: William A. Keegan, New Hartford, CT (US); Stanley G. Tomalesky, Plantsville, CT (US)

(73) Assignee: ALSTOM Technology Ltd, Baden (CH)

( * ) Notice: Subject to any disclaimer, the term of this patent is extended or adjusted under 35 U.S.C. 154(b) by 1321 days.

(21) Appl. No.: 11/502,433

(22) Filed: Aug. 11, 2006

(65) Prior Publication Data
US 2008/0066604 A1    Mar. 20, 2008

(51) Int. Cl.
*B23D 21/14* (2006.01)
(52) U.S. Cl. ............... 83/178; 83/186; 83/189; 83/886; 83/743
(58) Field of Classification Search .................. 83/186, 83/189, 886–887, 185, 179, 178, 743; 166/55–55.7
See application file for complete search history.

(56) References Cited

U.S. PATENT DOCUMENTS

| | | | |
|---|---|---|---|
| 760,148 A | 5/1904 | Poppenhusen | |
| 1,002,153 A * | 8/1911 | Jam | 166/55.2 |
| 1,273,831 A | 7/1918 | Dee | |
| 2,942,092 A * | 6/1960 | Cammann | 219/69.2 |
| 3,196,722 A * | 7/1965 | Lewis et. al. | 83/887 |
| 4,180,903 A | 1/1980 | Hannigan, Jr. | |
| 4,182,418 A * | 1/1980 | Jannsen | 166/298 |
| 4,192,067 A * | 3/1980 | Calhoun et al. | 30/379 |
| 4,231,246 A | 11/1980 | Gorenc et al. | |
| 4,471,516 A | 9/1984 | Godbe | |
| 4,550,532 A * | 11/1985 | Fletcher et al. | 451/5 |
| 4,577,388 A * | 3/1986 | Wood | 29/558 |
| 4,648,447 A * | 3/1987 | Bishop et al. | 166/173 |
| 5,076,311 A * | 12/1991 | Marschke | 137/15.14 |
| 5,509,847 A * | 4/1996 | Jinno et al. | 451/11 |
| 5,784,789 A * | 7/1998 | Vargas | 30/388 |
| 5,826,334 A * | 10/1998 | Weeks et al. | 29/890.031 |
| 5,974,924 A * | 11/1999 | Schartinger et al. | 83/184 |
| 6,626,074 B1 * | 9/2003 | Wheeler | 82/113 |
| 7,249,918 B1 * | 7/2007 | Bowman | 409/132 |
| 2005/0072282 A1 * | 4/2005 | Lavoie | 83/452 |

FOREIGN PATENT DOCUMENTS

SU    1267-107 A    10/1986

* cited by examiner

*Primary Examiner* — Boyer D Ashley
*Assistant Examiner* — Omar Flores-Sánchez
(74) *Attorney, Agent, or Firm* — Antonelli, Terry, Stout & Kraus, LLP.

(57) ABSTRACT

An apparatus (400) for facilitating the removal of a tube stub from a drum includes an arbor (401) configured to extend within the tube stub to be removed, and a circular, rotating cutter (402) protruding from the arbor (401). The cutter (402) is configured to score an internal surface of the tube stub along an axial direction of the tube stub. A controller (403) associated with the apparatus (400) controls the axial and rotational movement of the arbor (401) to create one or more cuts in the tube stub to facilitate removal of the tube stub from the drum.

14 Claims, 6 Drawing Sheets

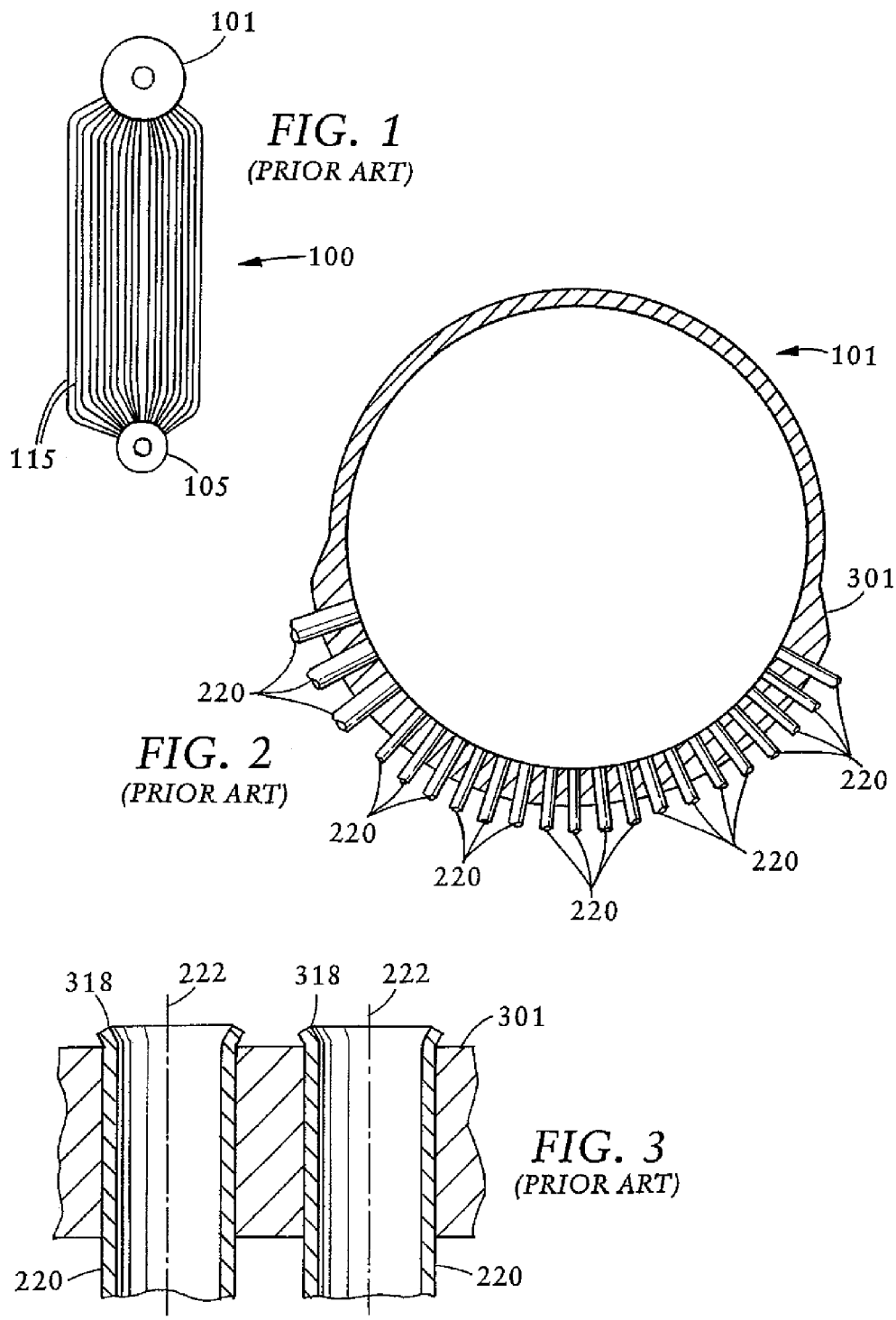

TUBE STUB REMOVAL APPARATUS

FIELD OF THE INVENTION

The present invention relates to boiler bank tubes of steam generating systems, and more particularly to an apparatus used in the removal of boiler bank tubes.

BACKGROUND

A "boiler bank" is a component in the circulation system of various types of utility and industrial steam generators that acts as a heat sink to reduce flue gas temperature. The boiler bank includes a steam drum and one or more lower drums interconnected by a plurality of tubes. Each of the drums of a boiler bank may be generally cylindrical and is provided with a plurality of radially extending bores arrayed in rows and columns on the cylindrical face thereof. Ends of the tubes are secured within the radially extending bores to provide fluid communication between the steam drum and the one or more lower drums.

A typical steam drum has a diameter of between three and six feet, and a typical lower drum has a smaller diameter. Also typically, the spaced tubes may be about twenty feet long, though other lengths are certainly known. Typical tubes often have a diameter of about two to three inches and a varying wall thickness depending on pressure and operating temperatures.

Original installation of a boiler bank tube typically involves inserting ends of the tube in the radially extending bores in each of the drums. In many cases, the ends of the tubes are swaged down to a required outside diameter to fit the bore. Once inserted, the ends of the tubes may be subjected to a rolling process. The tube rolling process utilizes a mandrel which is inserted into the end of the tube from the inside of the drum into which that end is inserted. This tool exerts an outward radial force on the inside surface of the tube causing the tube to expand and form a gas tight seal with the drum. During this process, the wall thickness of the tube in the area of the seal is slightly reduced and the tube end may be flared inside the drum or recessed in a counterbore.

Those skilled in the art will understand that the bores in the drum are cylindrical and are not chamfered. The cylindrical wall of the drum, commonly referred to as the drum sheet, usually has a thickness of between 2.5 to 5.0 inches.

Periodically, the individual tubes of the boiler bank require replacement due to long term exposure to high gas temperatures and velocities. Both erosion and corrosion play a role in reducing the life of the boiler bank tubes. When the wall thickness of a tube is reduced below the minimum wall thickness allowed by ASME code requirements, the tube is generally removed and replaced. The removal process typically involves cutting off the tube to be replaced at an axial point outside of the drum, thus leaving a relatively small portion of the tube (a "tube stub") attached to the drum. Because the tube is flared on the inside of the drum the removal of the remaining tube stub is generally performed from the inside of the drum.

The difficulty involved in removing the tube stubs will be better understood by consideration of the size of the drum, the tenacity of the engagement between the tubes and the drum sheet, the necessity of performing the work inside the drum because the flared portion of the tube is inside the drum, the size of the workman performing the work, and the location of obstructions within the drum. The obstructions include centrifugal separators, screen dryers and various pipes.

The removal of boiler bank tubes results in a significant number of man hours each year. The removal of boiler bank tubes is a tedious process and, in many cases, results in damage to the drum sheet. The repair or replacement of the drum sheet can be very expensive.

Several methods have been employed for removing boiler bank tubes with varying success. The most common prior art method involves the use of a brazing tip on an oxy-acetylene torch to cut a narrow slot along the length of the tube stub. Once the slot has been formed, the tube stub can generally be hammered or chiseled to free the tube stub from the drum sheet, which may score the drum sheet and prevent the new, replacement tube from ever obtaining an adequate seal with the drum sheet. In addition, this is a time consuming process and requires a skilled boilermaker in order to achieve the desired success.

Other prior art approaches have included various hydraulic tools to remove the tube stub. Some of them may be adequate for tubes having especially thin walls or which engage especially thin surfaces, such as found in some particular types of heat exchangers. One known approach is to insert a gripper into the tube end and force the gripper outward to embed a series of screw type threads into the inside surface of the tube. As the threads grasp the tube, the tool simultaneously attempts to pull the tube and break the seal between the tube and the drum sheet. Although this tool has worked for smaller diameter tubes, it is not wholly satisfactory for removal of boiler bank tube stubs. The large tubes used in such applications and the larger area of contact between the tube and the drum sheet make the removal task more difficult. At least partly because of the larger area of contact, the threads of the tool will loose their grip on the tube before the tube separates from the drum sheet. An additional factor is that such a prior art tool functions by applying an outward force to the inside of the tube. This is inherently counterproductive because the outward force pushes the tube wall firmly against the drum sheet from which separation is desired.

Thus, there remains a need for an apparatus that will facilitate the quick removal of tube stubs from a drum with minimum risk of damage to the drum, and that requires less skill to use than conventional tube stub removal techniques.

SUMMARY OF THE INVENTION

The above needs, as well as other features and advantages, are met by an apparatus for facilitating the removal of a tube stub from a drum. The apparatus includes an arbor configured to extend within the tube stub and a rotatable cutter protruding from an external surface of the arbor. The rotatable cutter is configured to score an internal surface of the tube stub along an axial direction of the tube stub to facilitate the removal of the tube stub from the drum. The apparatus may include a cutter motor attached to the arbor; and at least one chain disposed within the arbor and configured to transfer power from the cutter motor to the cutter to cause the cutter to rotate.

In various embodiments, an adjustable barrier member is configured to cover at least a portion of the cutter protruding outside of the arbor for adjusting a depth of the score in the tube stub. A spring loaded member may be disposed on the arbor and positioned opposite the barrier member to force the cutter toward the tube stub when the arbor is inserted into the tube stub.

In various embodiments, the apparatus includes an anchor device for insertion into a second tube stub adjacent to the tube stub to be removed; the anchor device is configured to expand within the second tube stub to anchor the apparatus to the drum. The apparatus may also include an alignment boss for insertion into a third tube stub, wherein the alignment boss is adjustable to vary the distance between the anchor device and the alignment boss based upon the distance between the second tube stub and the third tube stub.

In various embodiments, the apparatus includes a feed motor coupled to the arbor by a gear mechanism. The feed motor drives the gear mechanism to move the arbor along a longitudinal axis of the arbor. The apparatus may also include an index motor coupled to the arbor by a gear mechanism, wherein the index motor drives the gear mechanism to rotate the arbor about a longitudinal axis of the arbor. The apparatus may further include a controller configured to control the cutter motor, feed motor, and index motor in response to user input parameters. The user input parameters may include at least one of i) a number of scores to be made around the interior of the tube stub, ii) a pattern of scores to be made around the interior of the tube stub, iii) a score depth, iv) a score length, and v) a speed at which a score is to be made along the axial direction of the tube stub. The user input parameters may be input before the cutter begins to score the tube stub, and the controller automatically controls the cutter motor, feed motor, and index motor to score the tube stub in response to the user input parameters.

BRIEF DESCRIPTION OF THE DRAWINGS

In order to facilitate a fuller understanding of the present invention, reference is now made to the appended drawings wherein like items are numbered alike in the various Figures. These drawings should not be construed as limiting the present invention, but are intended to be exemplary only.

FIG. 1 is an elevation view of a boiler bank, including a steam drum, a lower drum, and tubes connecting the drums.

FIG. 2 is a sectional view taken along a plane perpendicular to the axis of a drum.

FIG. 3 is a sectional view of a portion of the drum of FIG. 2, taken along a plane passing through the centerlines of the tube stubs of FIG. 2.

DETAILED DESCRIPTION

Figure 4:
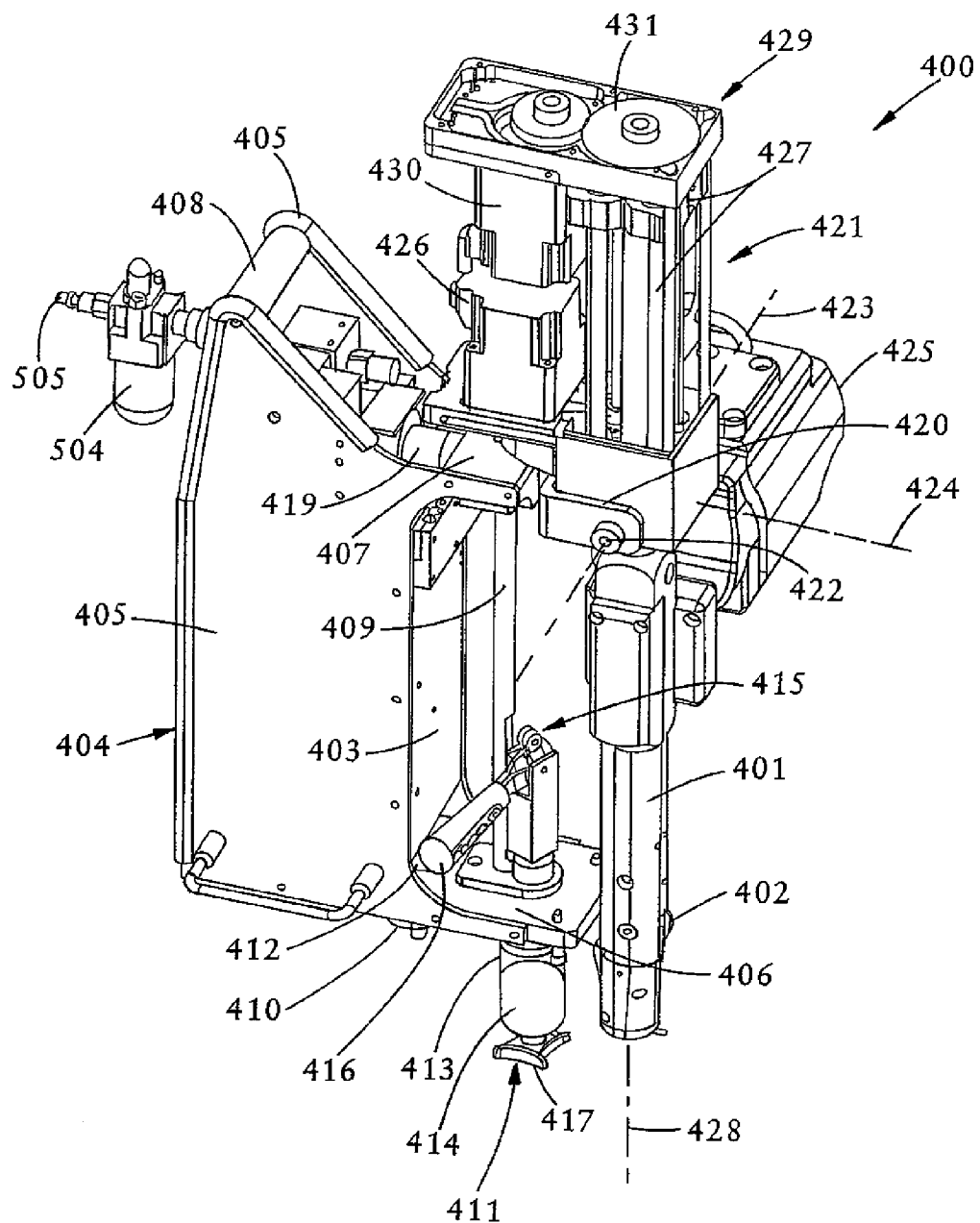
FIG. 4 is a perspective view of an apparatus for facilitating the removal of a tube stub from a drum in accordance with an embodiment of the present invention.

Referring now to FIG. 1 there is shown a boiler bank 100 that includes a cylindrical steam drum 101, a smaller cylindrical lower drum 105 (sometimes referred to as a mud drum) and a plurality of tubes 115 that connect the cylindrical steam drum 101 and the lower drum 105. The tubes 115 that appear in FIG. 1 have the centerlines thereof generally disposed in a common plane. Many additional pluralities of tubes are each typically disposed with the centerlines thereof in respective planes that are generally parallel to the plane defined by the centerlines of the tubes 115 that are visible in FIG. 1. The other tubes 115 are not visible in FIG. 1 because they are directly behind respective tubes 115 illustrated in FIG. 1. As will be understood by one of ordinary skill in the art, a boiler bank 100 may have more than one lower drum 105.

When replacement of any of the tubes 115 is necessary, each tube 115 to be replaced is typically removed by cutting the tube 115 proximate each of the drums 101 and 105 and removing the center portion of the tube 115 from the boiler bank 100. Relatively small end portions of the tube 115, the "tube stubs", remain attached to each of the drums 101 and 105 after the center portion of the tube 115 has been cut and removed.

FIG. 2 illustrates a cross section of a steam drum 101 having a plurality of tube stubs 220 attached thereto. As will be apparent from FIG. 3, the installation process for placing tubes 115 into the drum sheet 301 of the steam drum 101 may cause a flaring of the axial extremity of each tube 115 that is inside the steam drum 101. The flare is identified by the reference numeral 318 herein. It will be appreciated that the same flaring of a tube 118 may take place within a lower drum 105 as well during installation.

Referring to FIGS. 1 through 3, the difficulties associated with removing the tube stubs 220 from the steam drum 101 and the lower drum 105 in boiler bank 100 is well known, as discussed above. While removal is difficult in both the steam drum 101 and the lower drum 105, it is further complicated in the lower drum 105 by the smaller diameter thereof and the inherent requirement of working "overhead" instead of along the bottom inside surface of the steam drum 101.

FIG. 4 depicts an apparatus 400 for facilitating the removal of a tube stub 220 from a drum 101 or 105 (FIG. 1) in accordance with an embodiment of the present invention. Referring to FIGS. 3 and 4, the apparatus 400 includes an arbor 401 configured to extend within a tube stub 220 such that an axis 428 of the arbor 401 extends generally parallel to or coincident with the longitudinal axis 222 of the tube stub. Protruding from the arbor 401 is a circular, rotating cutter 402, which is configured to score (cut) the tube stub 220 along an axial direction of the tube stub 220 (i.e., in a direction substantially parallel to longitudinal axis 222). A controller 403 associated with the apparatus 400 controls the axial and rotational movement of the arbor 401 to create one or more cuts in the tube stub 220. Each of the one or more cuts created in the tube stub 220 may be entirely through, or substantially through, the thickness of the tube stub 220 to facilitate the removal of the tube stub 220 from the drum sheet 301.

As shown in FIG. 4, the apparatus 400 includes a main housing 404, which includes spaced-apart, parallel side plates 405, and a base plate 406 rigidly secured to, and extending between, the side plates 405. The main housing 404 also includes a gimbal bearing block 407, a handle 408, and the controller 403, each of which is rigidly secured to, and extends between the side plates 405. A tie rod 409 extends between the base plate 406 and the gimbal bearing block 407 to transfer at least part of the operating load between the base plate 406 and the gimbal bearing block 407.

Secured to, and protruding from, the base plate 406 are an alignment boss 410 and an anchor device 411. A portion of the alignment boss 410 is disposed through a slot 412 formed in the base plate 406, which allows movement of the alignment boss 410 along the slot 412. A lock nut (not shown) may be used to secure the alignment boss 410 in-place. The anchor device 411 includes an upper wedge portion 413, a lower wedge portion 414, and a toggle device 415. Toggle device 415 includes a locking lever 416 coupled to a wingnut 417 by a bolt (not shown), which extends through the base plate 406, the upper wedge portion 413, and the lower wedge portion 414.

The gimbal bearing block 407 has an aperture disposed therein (not shown) for receiving a pin 419 that is attached to a base of a generally U-shaped gimbal yoke 420. Disposed within the gimbal yoke 420 is a feed mechanism 421, which is secured to the free ends of the yoke 420 by pins 422. The feed mechanism 421 is pivotable about the axis of the pins 422, which is indicated at 423. Furthermore, the feed mechanism is pivotable about the axis of pin 419, which is indicated at 424.

Protruding out of the feed mechanism 421 is the rotatable arbor 401 which has a cutter motor 425 attached thereto. Near the end of the arbor 401 is the circular, rotating cutter 402, a portion of which protrudes out of one side of the arbor 401. The cutter motor 425 drives the cutter 402 via a chain mechanism within the arbor 401, as will be described in further detail hereinafter. The cutter motor 425 may include, for example, an alternating current (AC) induction motor.

The feed mechanism 421 includes a feed motor 426, which is coupled to the arbor 401 via a gear mechanism 427, which may be a screw drive mechanism or the like. The feed mechanism 421 operates to move the arbor 401 (and attached cutter motor 425) in the axial direction of the arbor 401. The feed motor 426 may include, for example, an AC stepper motor.

Attached to the feed mechanism 421 is an index mechanism 429, which operates to rotate the arbor 401 about its axis 428. The cutter motor 425, which is attached to the arbor 401, will rotate with the arbor 401. The index mechanism 429 includes an index motor 430 that is coupled to the arbor 401 by a gear mechanism 431. The index motor 430 may include, for example, an alternating current (AC) stepper motor.

Figure 5:
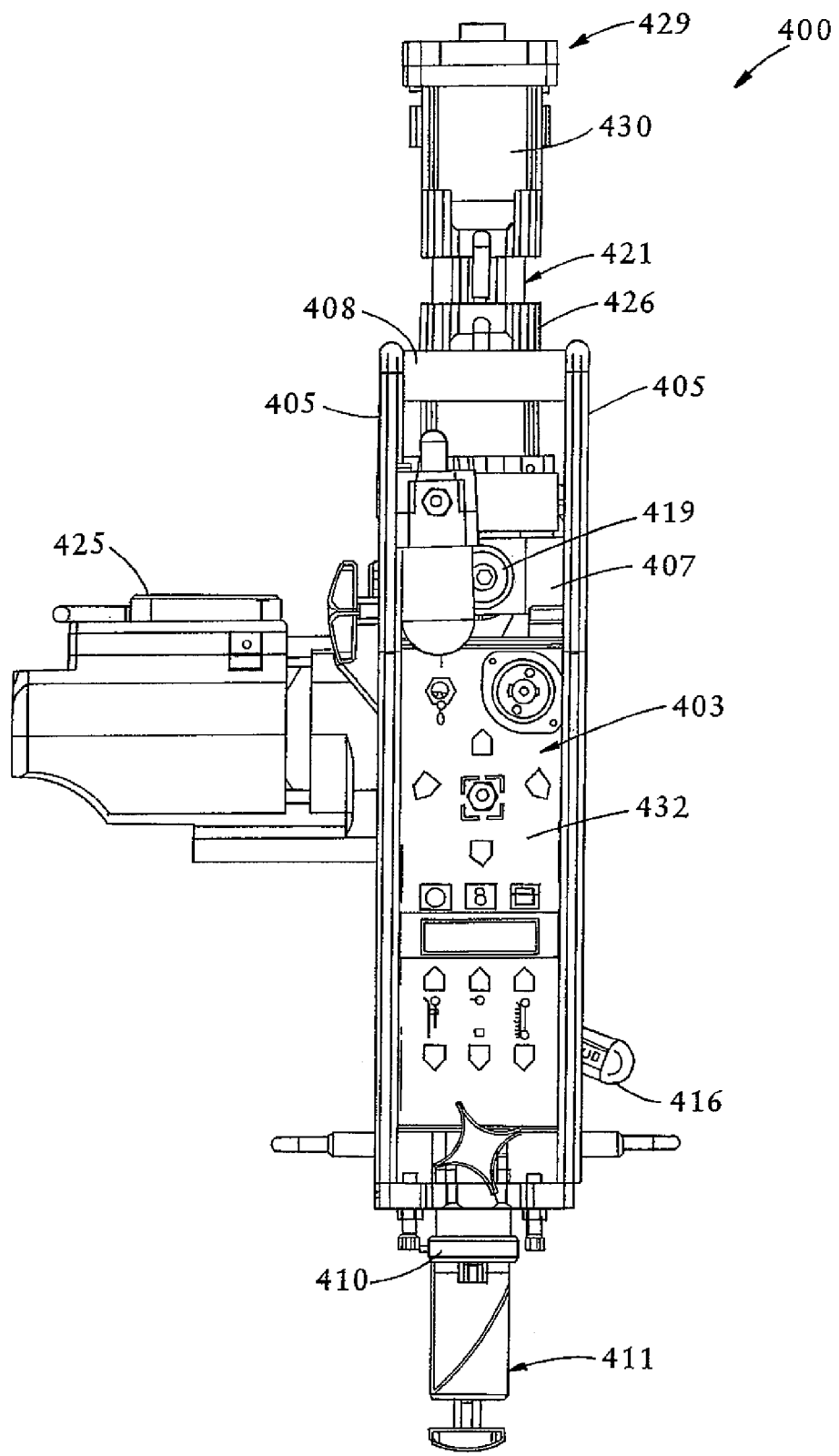
FIG. 5 is an elevation view of the apparatus of FIG. 4, depicting a user interface of the apparatus.

Referring to FIG. 5, the cutter motor 425, feed motor 426, and index motor 430 are controlled by a programmable logic controller 403, which may be a microprocessor, integrated circuit device, analog circuitry, or the like. The controller 403 includes a user interface 432, which allows a human operator (user) of the apparatus 400 to input parameters used in the cutting process, such as, for example, cutter 402 rotation speed, speed of cutter 402 longitudinal travel along axis 428, distance of cutter 402 travel along axis 428, and number and position of cuts to be made in the tube stub 220. The controller 403 includes logic that automatically controls the operation of each of the cutter motor 425, feed motor 426, and index motor 430 to perform the cut(s) in the tube stub 220 in accordance with the user input parameters. The user interface 432 also includes controls that allow the user to bypass the automatic control and directly adjust the operation of any of the cutter motor 425, feed motor 426, and index motor 430.

Figure 6:
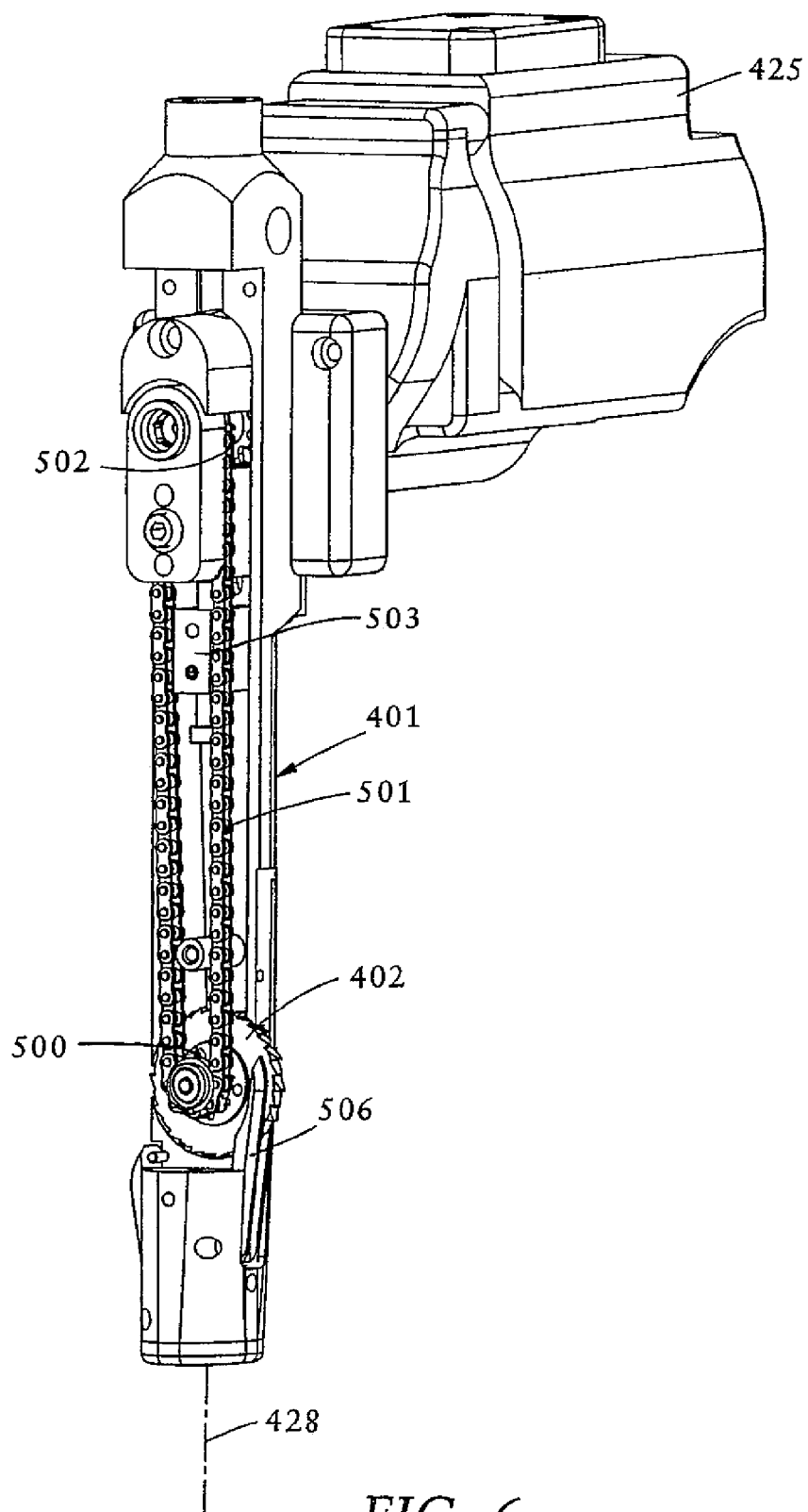
FIG. 6 is a perspective view depicting an internal portion of an arbor of the apparatus of FIG. 4.

FIG. 6 depicts an internal portion of the arbor 401. As seen in the embodiment of FIG. 6, the cutter 402 is a circular blade having teeth disposed around its perimeter. Cutter 402 is preferably formed from a carbide material; however, it is contemplated that the cutter 402 may employ different materials and/or designs.

Rigidly attached to a side of the cutter 402 is a sprocket 500, which is driven by a chain 501. The chain is also coupled to a drive sprocket 502, which is driven by the feed motor 425. Although not shown in FIG. 6, another chain 501, sprocket 500, and drive sprocket 502 are disposed on the opposite side of cutter 402. A tensioning device 503 moves the drive sprocket 502 in the direction of axis 428 to tension the chain 501. Referring to FIGS. 4 and 6, the chain 501 and cutter 402 are lubricated by oil, which is contained in a reservoir 504 and delivered as a mist to the chain 501 and cutter 402 via machined keyways in the arbor 401. A pneumatic line 505 receives pressurized air to deliver the oil mist to the chain 501 and cutter 402.

Referring again to FIG. 6, the cutting depth of the cutter 402 into a tube stub 220 (FIG. 3) can be varied, typically depending upon the thickness of the tube stub 220 being cut. The cutting depth is varied by use of a barrier member 506, which adjusts the amount of the cutter 402 that is exposed for cutting the tube stub 220. For example, the more of the cutter 402 that is revealed by the barrier member 506, the deeper the cutting depth.

Figure 7:
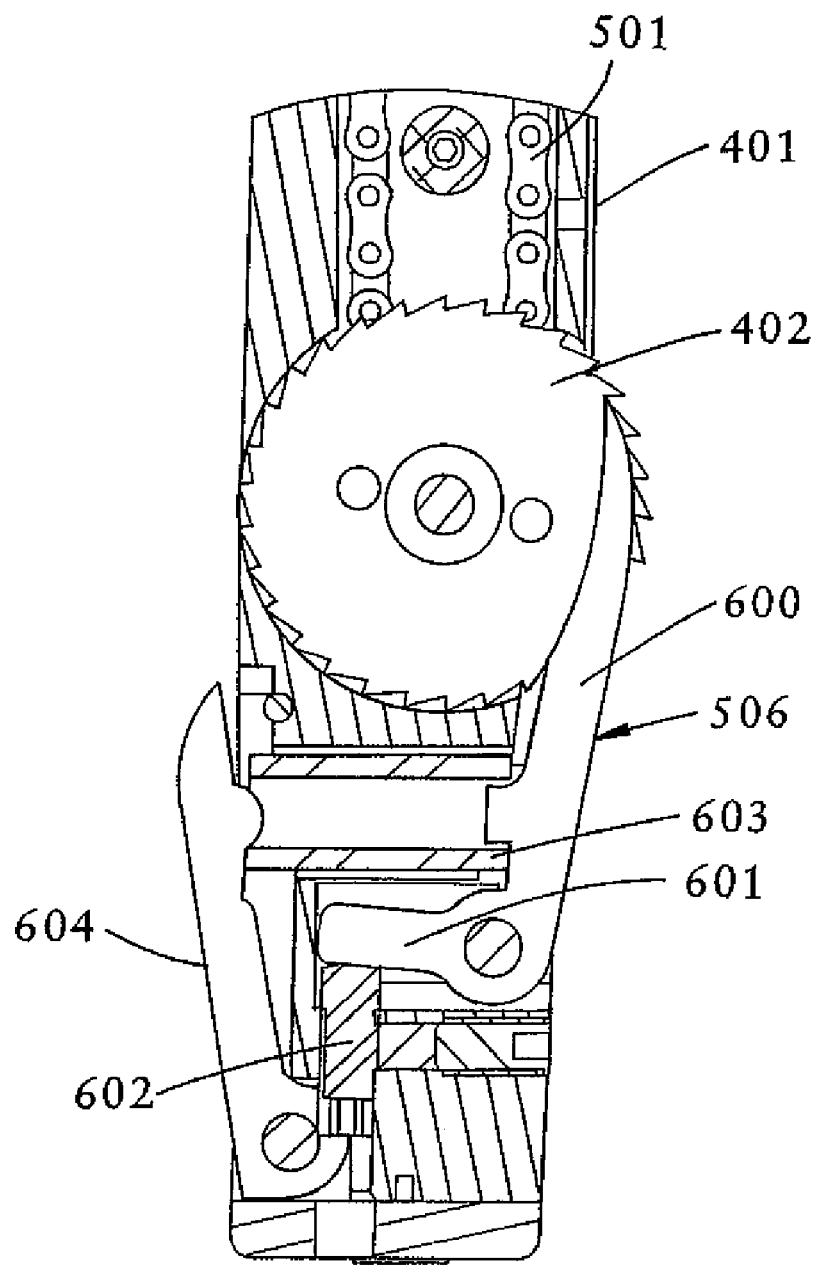
FIG. 7 is a sectional view of a portion the arbor of FIG. 6.
Figure 8B:
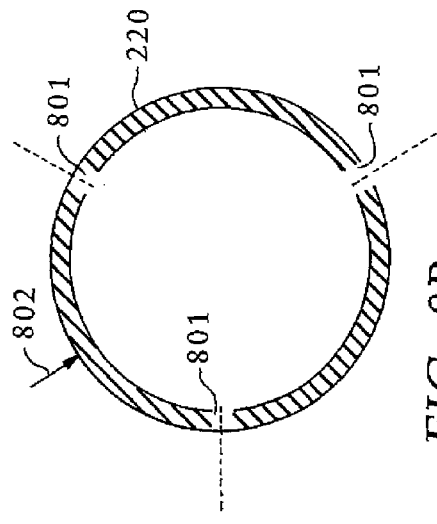
FIGS. 8A-8D depict cut patterns which can be made utilizing the apparatus of FIG. 4.
Figure 8D:
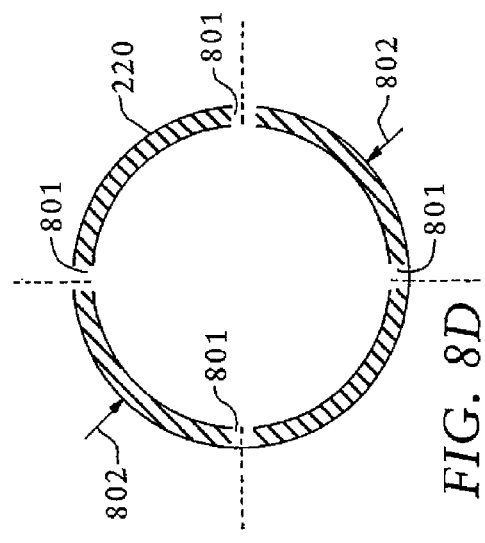
Figure 8A:
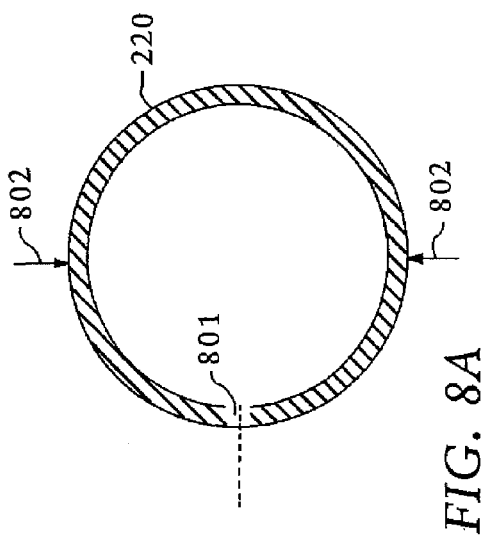
Figure 8C:
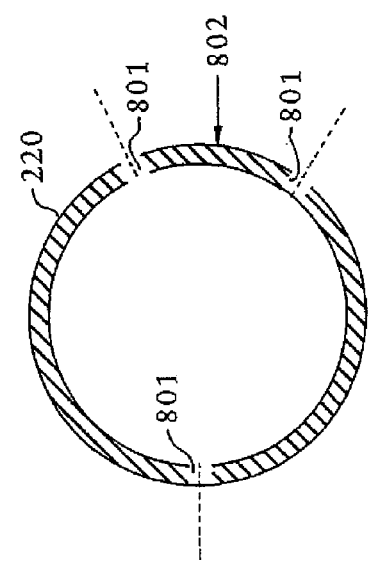

FIG. 7 is a cross-sectional view of the end portion of the arbor 401, which shows the barrier member 506. In the embodiment shown, the barrier member 506 is a generally L-shaped member pivotally attached to the arbor 401. One leg of the L-shaped member, indicated at 600, acts as a barrier to the cutter 402, and the other leg of the L-shaped member, indicated at 601, is positioned proximate a set screw 602, which is threaded in the arbor 401. The leg 600 may be slotted, with the cutter 402 positioned in the slot such that a portion of the leg 600 is disposed on either side of the cutter 402. The exposed amount of the cutter 402, and thus the depth of the cut, is adjusted by adjusting the set screw 602, which abuts against the leg 601.

In the embodiment shown in FIG. 7, a spring 603 forces the barrier leg 600 in a direction away from the arbor 401. Thus, when the cutter 402 is removed from a tube stub 220, the spring-loaded barrier member 506 covers the cutter 402. As the arbor 401 is inserted into the tube stub 220, the barrier member 506 pivots against the force of the spring 603 to reveal the cutter 402. Also in the embodiment shown, the arbor 401 includes a second spring loaded member 604 protruding from the arbor 401 and positioned opposite the barrier member 506. The second spring loaded member 604 is pivotally attached to the arbor 401 and acts to force the cutter 402 toward the portion of the tube stub 220 to be cut when the arbor 401 is inserted into the tube stub 220. Advantageously, the spring loaded members 604 and 506 allow a single arbor 401 to be used for a wide range of tube sizes. For example, a single arbor 401 may be used to cut tubes ranging 2 inch outside diameter (OD)×0.22 inch thick (1.56" inside diameter (ID)) to 3" OD×0.15" thick (2.70" ID).

Referring to FIGS. 1 through 7, operation of the apparatus 400 will now be described. First, the user adjusts the spacing between the alignment boss 410, anchor device 411, and arbor 401 such that each of these members will fit into adjacent tube stubs 220 in the drum sheet 301. It should be noted that either, or both of, the anchor device 411 and the adjustable alignment boss 410 can be positioned in a hole in which a tube stub 220 has previously been removed, as well as in a tube stub 220 itself. It will also be appreciated that the gimbal yoke 420 allows the arbor to 401 to be positioned in a plane other than a plane perpendicular to a plane in which the base portion 406 extends.

The user then adjusts the barrier member 506 to the desired cut depth, depending on the wall thickness of the tube stub 220. Next, with the locking lever 416 in the released position, the alignment boss 410, anchor device 411, and arbor 401 are disposed in adjacent tube stubs 220 in the drum sheet 301. The user then moves the locking lever 416 to the locked position, which causes the anchor device 411 to expand and exert a force against the inside of the tube stub 220 into which that anchor device 411 has been placed. In this manner, the anchor device 411 holds the apparatus 400 in place. It should be noted that the anchor device 411, when expanded, can keep the apparatus 400 in place upside down, or at any other angle. Thus, the apparatus 400 can be used to cut any tube stub 220, no matter the orientation of that tube stub 220, i.e., overhead, underfoot, or any position in between. Furthermore, because of the anchor device 411, the apparatus 400 can be used either inside or outside of a steam drum 101 or lower drum 105.

With the apparatus 400 secured in position, the user connects the operating power and service air to the apparatus 400, if this has not already been done. Next, the user inputs operating parameters into the controller 403 via the user interface 432.

FIG. 8 depicts four pre-programmed cut (score) patterns the user may select from. However, it should be understood that the apparatus 400 can be pre-programmed with any pattern, or patterns, desired. As shown, with the pre-programmed patterns of the present example, a single cut 801 can be made (FIG. 8A); three evenly spaced cuts 801 can be made (FIG. 8B); three unevenly spaced cuts can be made to provide a "crows foot" pattern (FIG. 8C); or four evenly spaced cuts 801 can be made (FIG. 8D). Based upon the pre-programmed pattern chosen, the controller 403 controls the index motor 415 to rotate the arbor 430 to move the cutter 432 into the appropriate position.

The length of a cut made by the cutter 435, as measured from a flared end 318 of a tube stub 220, is also programmable by the user. In one embodiment, the apparatus 400 can be programmed to make each cut from a half inch long to six inches long, though other lengths are certainly within the capabilities of the present invention.

In addition to cut length, the speed at which a cut is made is also programmable by the user. That is, the speed at which the arbor 401, and hence the cutter 402, is drawn along the length of the tube stub 220 by the feed mechanism 421, powered by the feed motor 426, is variable. In one embodiment, this is an "inches per minute" adjustment. Of course, other measurements, as desired, could be used.

Once the operating parameters are input, the user presses a start button on the user interface 432, which initiates the cutting process. Thus, once the apparatus 400 is adjusted, installed, programmed, and started, the apparatus 400 performs the cutting process with no interaction by the user. It will be appreciated that once the apparatus 400 is adjusted and programmed for cutting one tube stub 220, the same configuration and program can be used to cut other tube stubs in the same drum. As a result, the time to perform subsequent cuts is reduced.

As an alternative to pre-programming the apparatus 400, each of the programmed variables discussed above, cut depth, cut pattern, cut length, and cut speed, can also, as desired, be manually controlled through controls on the user interface 432.

Once the one or more cuts 801 in the tube stub 220 are made, the user then compacts the end of the tube stub 220 in a direction towards the longitudinal axis of the tube stub 220, as indicated at arrows 802 of FIGS. 8A through 8D, so that the tube stub 220 can be completely removed from the drum sheet 301. The compacting can be by any conventional method.

The apparatus 400 of the present invention requires less skill than conventional methods of tube stub 220 removal. That is, the user does not have to possess welding skills, and can operate the apparatus 400 by a few simple adjustments and entry of parameters into the user interface 432. Furthermore, a more comfortable working environment is provided because of the elimination of cutting fumes and sparks. Additionally, using the apparatus 400 results in a less costly operation, as highly skilled workmen do not have to be utilized, the time to remove tube stubs 220, and thus outage duration, is reduced, and there is no need to perform weld repairs that often result from torch removal. Once the apparatus 400 is adjusted, installed and programmed, the cutting process is performed quickly with no interaction by the service technician needed. For example, it has been determined that for 2 inch OD×0.165 inch thick tube stubs, the four cuts 801 indicated in FIG. 8D can be completed by the automated cutting tool 400 in less than four minutes, with a total tube stub removal time of less than six minutes.

The present invention is not to be limited in scope by the specific embodiments described herein. Indeed, various modifications of the present invention in addition to those described herein will be apparent to those of skill in the art from the foregoing description and accompanying drawings. Thus, such modifications are intended to fall within the scope of the appended claims.

What is claimed is:

1. An apparatus for facilitating the removal of a tube stub from a drum, comprising:
   an arbor configured to extend within the tube stub
   a rotatable cutter protruding from an external surface of the arbor and configured to score an internal surface of the tube stub along an axial direction of the tube stub to facilitate removal of the tube stub from the drum;
   a cutter motor attached to the arbor;
   at least one chain disposed within the arbor and configured to transfer power from the cutter motor to the cutter to cause the cutter to rotate;
   an anchor device for insertion into a second tube stub adjacent to the tube stub, wherein the anchor device is configured to expand within the second tube stub to anchor the apparatus to the drum; and
   an adjustable barrier member configured to move relative to the cutter and to cover at least a portion of the cutter protruding outside of the arbor for adjusting a depth of the score in the tube stub.

2. The apparatus of claim 1, further comprising:
   a spring loaded member disposed on the arbor and positioned opposite the barrier member, wherein the spring loaded member forces the cutter toward the tube stub when the arbor is inserted into the tube stub.

3. The apparatus of claim 1, further comprising:
   an alignment boss for insertion into a third tube stub;
   wherein the alignment boss is adjustable to vary the distance between the anchor device and the alignment boss based upon the distance between the second tube stub and the third tube stub.

4. The apparatus of claim 1, wherein the anchor device is further configured to insert into the second tube stub from one of i) inside the drum and ii) outside the drum.

5. The apparatus of claim 1, further comprising:
   a feed motor coupled to the arbor by a gear mechanism, wherein the feed motor drives the gear mechanism to move the arbor along a longitudinal axis of the arbor.

6. The apparatus of claim 1, further comprising:
   an index motor coupled to the arbor by a gear mechanism, wherein the index motor drives the gear mechanism to rotate the arbor about a longitudinal axis of the arbor.

7. The apparatus of claim 6, wherein the index motor drives the gear mechanism to rotate the arbor while the arbor is extended within the tube stub to position the rotating cutter about the interior of the tube stub.

8. The apparatus of claim 1, further comprising:
   a feed motor configured to move the arbor along a longitudinal axis of the arbor;
   an index motor configured to rotate the arbor about a longitudinal axis of the arbor; and
   a controller configured to control the cutter motor, feed motor, and index motor in response to user input parameters.

9. The apparatus of claim 8, wherein the user input parameters include at least one of i) a number of scores to be made around the interior of the tube stub, ii) a pattern of scores to be made around the interior of the tube stub, iii) a score depth, iv)

a score length, and v) a speed at which a score is to be made along the axial direction of the tube stub.

10. The apparatus of claim 9, wherein the user input parameters are input before the cutter begins to score the tube stub, and the controller automatically controls the cutter motor, feed motor, and index motor to score the tube stub in response to the user input parameters.

11. An automated apparatus for facilitating the removal of a tube stub from a drum, comprising:
   a arbor configured to extend within the tube stub;
   a rotating cutter protruding from an external surface of the arbor and configured to score an internal surface of the tube stub along an axial direction of the tube stub;
   a cutter motor attached to the arbor;
   at least one chain configured to transfer power from the cutter motor to the cutter to cause the cutter to rotate;
   a feed motor configured to move the arbor along a longitudinal axis of the arbor;
   an index motor configured to rotate the arbor about the longitudinal axis of the arbor;
   a controller configured to control the cutter motor, feed motor, and index motor in response to user input parameters;
   an anchor device for insertion into a second tube stub adjacent to the tube stub and configured to expand within the second tube stub to anchor the apparatus to the drum; and
   an adjustable barrier member configured to move relative to the cutter and to cover at least a portion of the cutter protruding outside of the arbor for adjusting a depth of the score in the tube stub.

12. The apparatus of claim 11, further comprising:
   an alignment boss for insertion into a third tube stub;
   wherein the alignment boss is adjustable to vary the distance between the anchor device and the alignment boss based upon the distance between the second tube stub and the third tube stub.

13. The apparatus of claim 11, wherein the user input parameters include at least one of i) a number of scores to be made around the interior of the tube stub, ii) a pattern of scores to be made around the interior of the tube stub, iii) a score depth, iv) a score length, and v) a speed at which a score is to be made along the axial direction of the tube stub.

14. The apparatus of claim 13, wherein the user input parameters are input before the cutter begins to score the tube stub, and the controller automatically controls the cutter motor, feed motor, and index motor to score the tube stub in response to the user input parameters.

* * * * *